Figure 1:
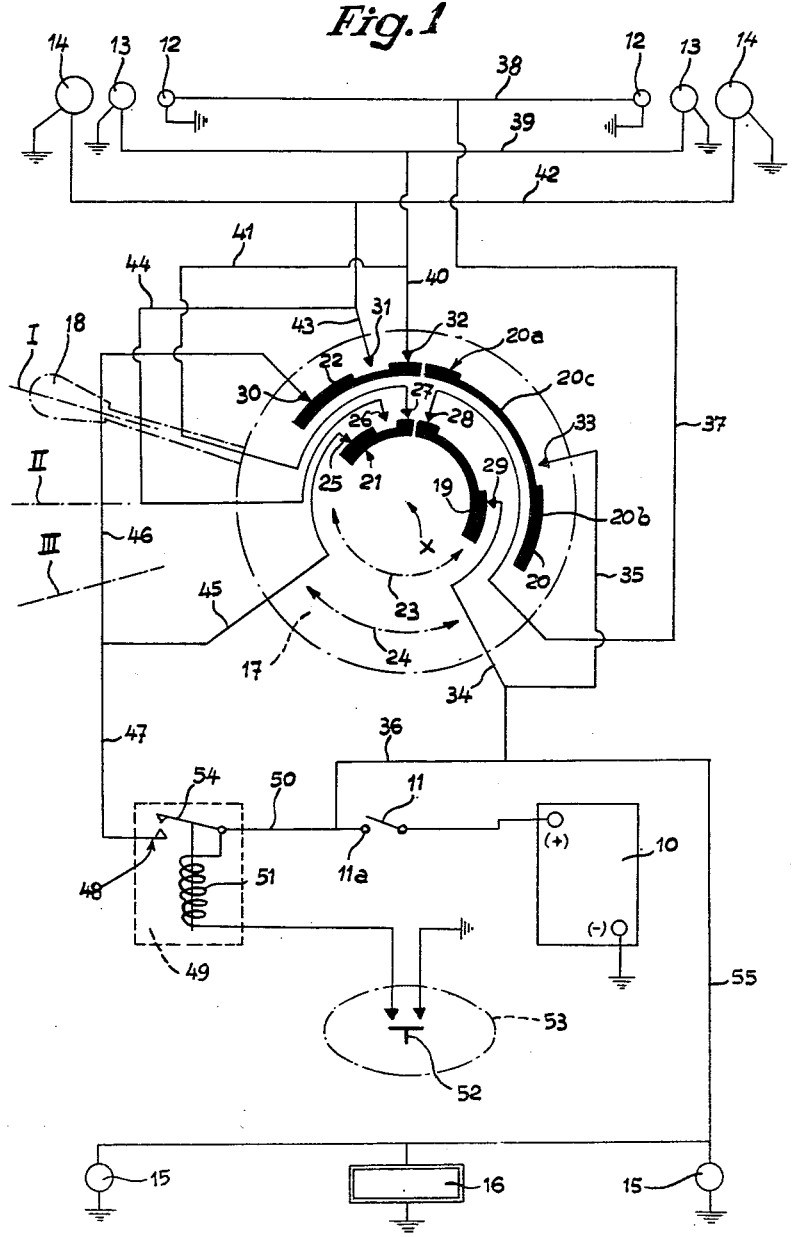

Dec. 11, 1956   D. GIACOSA   2,774,009
ELECTRIC LIGHTING AND SIGNALLING PLANT FOR MOTOR VEHICLES
Filed May 14, 1954   2 Sheets-Sheet 1

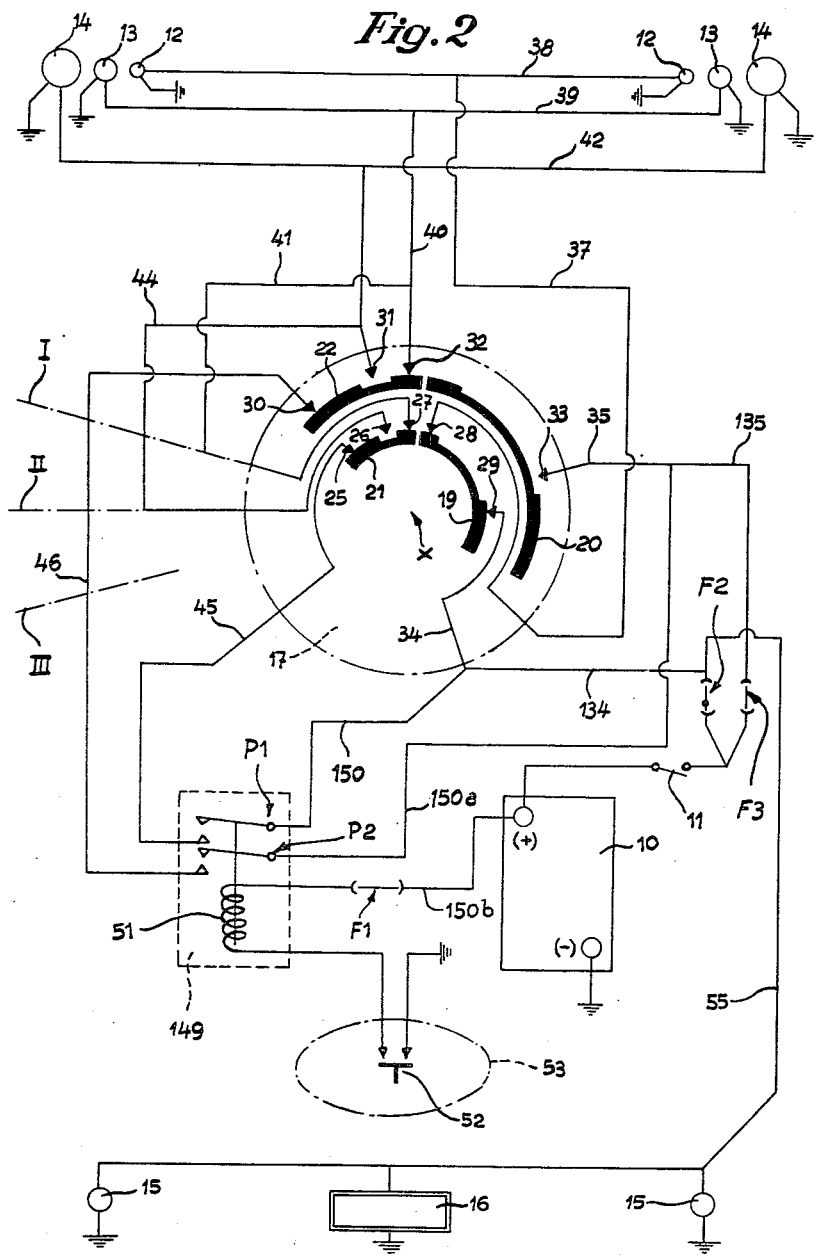

United States Patent Office 2,774,009
Patented Dec. 11, 1956

2,774,009

ELECTRIC LIGHTING AND SIGNALLING PLANT FOR MOTOR VEHICLES

Dante Giacosa, Turin, Italy, assignor to Fiat Società per Azioni, Turin, Italy

Application May 14, 1954, Serial No. 429,875

Claims priority, application Italy December 23, 1953

2 Claims. (Cl. 315—83)

This invention relates to electric plants for the outer lighting of motor vehicles of the type comprising a source of current, at least one set of outer lights including a city light, a crossing light and a country-light with their respective lead-in conductors and a change-over switch for selectively connecting to said source the city light, crossing light and country light in its first, second and third position, respectively.

More particularly, the invention relates to means adapted to integrate a plant of the type referred to above in order to enable the driver to further control, say by means of a press-button switch or other device the crossing lights or country-lights for signalling purposes, such as at a road-crossing or as an overtaking signal when driving at night. The instantaneous actuation of the said switch by the driver gives light flashes from country-lights or crossing lights according to the nature of the plant, affording a special signal well known to all motor vehicle drivers.

Various plants adapted to operate as mentioned above are at present known. It is known, for instance, to connect the country-lights to the source of current over a push-button switch arranged on steering wheel. With this arrangement, however one type of lights, namely either the country-lights or crossing lights may be employed for signalling. All further arrangements known have been developed along this example, so that they all suffer from the same drawback.

The main object of this invention is to provide a lighting and signalling plant for motor vehicles, in which the type of signalling light is automatically dependent upon and other than the type of light operating on the vehicle. In other words, assuming the vehicle is provided with the three abovementioned types of lights, the object of this invention is to permit light signals to be given from the crossing lights when the vehicle runs with the city lights on as in town, or from the country-lights, when the vehicle runs with the crossing lights on in a fully automatic manner, so that the driver has but to depress the push-button switch.

According to this invention an electric lighting and signalling plant for motor vehicles, of the type comprising a source of current, at least one set of outer lights, comprising in turn a city light, a crossing light and a country-light with their respective lead-in cables: a three-position change-over switch for selectively connecting to said source of current the city light, crossing light or country-light in its first, second and third position, respectively, and a circuit in parallel with said conductors for connecting the crossing lights or country-lights to said source through hand-controlled switch means in order to produce light flashes for signalling purpose, is characterised in that said circuit is selectively controlled by the same change-over switch mentioned above, said change-over switch comprising for this purpose contact and selecting sectors for connecting to the source of current the crossing lights in said first position, and further contacts for connecting to the source the country-lights in said second position.

Further details and advantages of this invention will be understood from the following description referring to the accompanying drawings given by way of example, wherein:

Figure 1 is a base diagram and
Figure 2 is a more detailed diagram of a modification of Figure 1.

In the figures, the same reference numerals denote similar parts. 10 denotes the motor vehicle battery, the negative pole of which is grounded, the positive pole supplying the full plant over a general switch 11. 12, 13 and 14 denote the city lights, crossing lights and country-lights of the vehicle. 15 denotes the rear lights of the vehicle and 16 the number plate light. 17 denotes the three-position change-over switch, consisting for instance of a body of insulating material provided with a hand lever 18 for rotating the body about the axis X perpendicular to the plane of the drawing for change-over purposes. The three operative positions of the change-over switch are defined on the drawing by the position, I, II and III of the control lever 18. In the example shown, in order to change-over from one operative position to the next one, the change-over switch should be rotated through one angular step equalling 15°. It will be obvious that this angular step may be selected at will; however, it was found that a 15° angle is particularly convenient both from the standpoint of construction and convenience of use. In actual construction the change-over switch 17 may be arranged on the instrument board of the vehicle or, more advantageously, on the steering column right below the steering wheel.

Four movable contact sectors are arranged on the rotary insulating body of the change-over switch, two of them being change-over sectors 19, 20, the other two being selecting sectors 21, 22. The change-over sector 19 and selecting sector 21 are arranged on a common circular path 23, the second change-over sector 20 and second selecting sector 22 being arranged on a further common circular path 24 distinct from 23. A set of stationary contacts 25 to 29 are associated with the sectors 19 and 21 and are angularly staggered in a relationship which is easily visible on the drawing. Similarly, the sectors 20, 22 have associated therewith a further set of stationary contacts 30 to 33, likewise arranged in the angular relationship clearly shown on the drawing. All said contacts 25 to 33 are fixedly mounted in the casing of change-over switch, which has not been shown on the drawing for the sake of simplicity. The contacts 29 and 33 are connected (Figure 1) over leads 34, 35, respectively to a lead 36 fed by the output terminal 11a of the general switch 11. The contact 28 which is supplied from the contact 29 over the change-over sector 19, is connected by leads 37, 38 to the city lights 12. The crossing lights 13 are connected over leads 39, 40 and 41 to the contacts 32 and 27 of the change-over switch 17. The country-lights 14 are connected by leads 42, 43 and 44 to the contacts 31 and 26 on the change-over switch 17. The contacts 25 and 30 on the change-over switch 17 are connected by leads 45, 46 and 47 to the output contact 48 of a relay 49, said relay being energized by the output terminal 11a of the general switch 11 over the lead 50. The energizing winding 51 of the relay 49 is controlled by means of a push-botton switch 52 arranged for instance at the centre of the steering wheel, the latter being diagrammatically denoted at 53. As will be clearly seen on the drawing, the arrangement is such that closure of the push-button switch 52 energizes the winding 51 which attracts the armature 54 of the relay establishing the contact at 48. The rear lights 15 and 16 are energized from the battery 10 through the general switch 11 and the leads 36 and 55.

It will be understood from the above that the plant described comprises two main circuits: a change-over circuit including the battery 10, general switch 11, leads 36, 34, 35, contacts 29, 33, movable change-over sectors 19, 20, stationary contacts 26, 27, 28, 31, 32 and leads 37 through 43 leading to the lights 12, 13 and 14; the selecting circuit for the signalling lights connected in parallel with the firstmentioned circuit and including the lead 50, relay 49, leads 47, 46 and 45, stationary contacts 30, 25, movable selecting sectors 22, 21, contacts 26, 27, 31, 32 and leads 39 to 44 leading to the lights 13 and 14.

Therefore, contacts 26, 27, 31 and 32 belong to the first or second circuit depending upon the position of the change-over switch 17. In both figures, the change-over switch has been shown in its first operative position for night drive in town with the city lights 12 connected to the terminal 11a of the general switch 11.

The plant described operates as follows.

In order to switch on any of the lights 12 to 16 the general switch 11 should be closed. It should be explained that this switch is electrically independent of the ignition switch or switch controlling the supply of current to the sparking plugs of the motor vehicle engine, though it can be mechanically connected with the latter to one unit. With the general switch 11 in its closed position, current flows to the contacts 29 and 33 over the leads 36, 34 and 35, and to the rear lights 15, 16 over the leads 36, 55. Said rear lights are not in the least affected by the position of the change-over switch 17 and are switched on during the whole time the general switch 11 is closed. Conditions are different in respect of the front lights 12, 13 and 14. Assuming the change-over switch 17 is in the position I shown, the contact is broken at 33, so that the change-over sector 19 only is fed at 29, and sends current to the city lights 12 over the contact 28 and leads 37, 38. The vehicle is conditioned for town drive, in accordance with the traffic rules in use practically in all countries. The same laws and logical considerations forbid the use of country-lights for signalling purposes in town, this use being justified and admissible on country roads. The plant according to this invention is particularly suitable for meeting these requirements. Actuation of the push-button switch 52 energizes the relay and closes the contact 48. Consequently, current is fed to the selecting sectors 21, 22, contacts 27, 32 and crossing lights 13. By repeatedly closing the push-button switch 52 the driver gives as many flashes of light from the crossing lights 13 by way of an overtaking, warning signal or the like.

In night drive in open country, the change-over switch 17 is generally in position III, in which the set of sectors 19—22 is rotated with respect to the stationary contacts 25—33 through two angular steps (in this case 15°+15°=30°) in anticlockwise direction. Consequently, owing to the special angular relationship of the sectors and stationary contacts, the contact 31 only is energized from the contact 33 through the change-over sector 20, all other contacts on the change-over switch 17 being disconnected. Since the contact 31 is connected over the leads 43, 42 to the country-lights 14, these lights only are on. Actuation of the push-button switch 52 in this position of the change-over switch is without effect. Assuming now that under the above circumstances an oncoming vehicle appears on the road in an opposite direction to the former the driver of the first vehicle moves the lever of the change-over switch 17 to the position II in order to put off the country-lights and put on the crossing lights 13. In fact, in position II the contacts 32 and 27 associated with the crossing lights 13 are energized from the energizing contacts 33 and 29 through the change-over sectors 20 and 19, respectively, while the contacts 31 and 26 associated with the country-lights 14 can be energized from the energizing contacts 30 and 25 through the selecting sectors 22, 21, respectively, only upon actuation of the push-button switch 52. The driver of the first vehicle is thus in a condition to give a desired signal by the country-lights 14, in case the other vehicle drives on with the country-lights on thereby glaring the driver on the first vehicle. It should be noted that in positions II and III of the change-over switch 17 the contact is broken at 28, so that the city lights are off. In order to put off all lights it will be sufficient to open the general switch 11.

In the foregoing description the terms "change-over sectors" and "selecting sectors" have been used by reason of the fact that the change-over sectors 19, 20 serve for changing over the lights 12, 13 and 14, while the selecting sectors 21, 22 automatically select the type of signalling lights as a function of the position of the change-over switch. It will be obvious to experts in the branch that the said sectors may be in the forms of metal plates or, for instance, the contacts regions 20a and 20b of one sector, say, 20, could be in the form of metal blocks embedded in the insulating body of the change-over switch and connected together by a lead 20c fully embedded in the said body. The body of the change-over switch can be of disc shape, as diagrammatically shown or of cylindrical or other shape, as is well known in this branch. What actually matters is that the lights 13 and 14 have associated thereto pairs of contacts 32, 27 and 31, 26, respectively, cooperating with the change-over sectors as well as the selecting sectors, said sectors being arranged, as explained above, on two distinct paths and being energized through pairs of energizing contacts 25 and 30, 29 and 33, in order to produce the above described effects.

The diagram of Figure 2 has been designed to take care more particularly of safety requirements of the plant according to this invention and with the specific object of making available to the driver at least one of the lights 12, 13, 14 in case of damage to one of the leads in the circuit. In said figure, the energizing coil of the relay 149 is fed through the lead 150b including a safety fuse F1, so that any damage to this energizing circuit will prevent at the utmost the use of the push-button switch 52 for signalling purpose, signalling being then effected by means of the change-over switch 17 without impairing the efficiency of the remainder of the plant. The energizing contacts 29 and 33 of the change-over sectors 19, 20, respectively are connected to the general switch 11 over two separate leads 134, 135, respectively, each including a fuse F2, F3, respectively. Similarly, the energizing contacts 25 and 30 on the selecting sectors 21 and 22 are connected over two separate leads 45, 46 to the relay 149 which is bipolar in this case, the pole P1 being connected to the lead 134 over a lead 150, the pole P2 being connected to the lead 135 over a lead 150a. The fuse F2 thus protects the energizing contacts 25 and 29, while the fuse F3 protects the energizing contacts 30 and 33. It will be clear that, in the arrangement just described, in case the fuse F2 is burnt, the sectors 19 and 21 cannot be energized, the city lights 12 associated with the contact 28 being off in all positions of the change-over switch 17. However, by moving the change-over switch to its position 11, the driver can put on the city lights 13 and give the lights signals by the country-lights 14, the sectors 20 and 22 being energized over the fuse F3 which is intact. The situation can be similarly visualized in case of damage to the fuse F3.

As is shown by the drawing the pairs of sectors, 20, 22 and 19, 21 each cover an angle smaller than 180°, so that all said sectors could be located on a common circumference, provided the path of one of said pairs at front of the respective stationary contacts cannot be followed by the other pair of sectors also. The expression "two distinct paths" previously employed therefore covers not only two parallel paths, but two aligned paths as well, which are limited by suitable stops acting on the movable body of the change-over switch.

It will be understood that the diagrammatic constructions shown and described may be modified in various manners without departing from the scope of the appended claims.

What I claim is:

1. Electric lighting plant for motor vehicles comprising a source of current, at least one set of outer lights including a city light, a crossing light and a country light, a first energizing circuit between the lights and the source comprising lead-in conductors, a three-position change-over switch, and change-over sectors incorporated by the switch for selectively energizing from the source the city light, crossing light and country light in a first, second and third position, respectively, of the switch; and a second energizing circuit in parallel with the said first circuit including selecting sectors incorporated by the change-over switch, a push-button operated switch for energizing the selecting sectors from the source of current, contacts selectively engageable by the selecting sectors, and conductors connecting different contacts to the crossing and country lights, respectively, whereby the crossing and country lights may be selectively energized in the said first and second position, respectively, of the change-over switch when the push-button switch is operated.

2. Electric lighting plant as claimed in claim 1, wherein the said change-over switch comprises a first change-over sector and a first selecting sector aligned on a common path, a second change-over sector and a second selecting sector aligned on a common path distinct from said first-mentioned path, a pair of contacts for each of said country-light and crossing light, the two contacts of each being arranged at one of said paths respectively and alternately cooperating with said change-over and selecting sectors on the respective path, a pair of contacts for energizing said selecting sectors from the push-button operated switch in the first and second position of the change-over switch and a further pair of contacts each energizing a change-over section from the source of current.

References Cited in the file of this patent

UNITED STATES PATENTS

| | | |
|---|---|---|
| 2,011,677 | Douglas | Aug. 20, 1935 |
| 2,014,592 | Schwarze | Sept. 17, 1935 |
| 2,125,990 | Catron | Aug. 9, 1938 |
| 2,508,630 | Wepfer | May 23, 1950 |